United States Patent
Agrawal et al.

(10) Patent No.: US 10,127,777 B1
(45) Date of Patent: Nov. 13, 2018

(54) STREETLIGHT CONTROL FOR EMERGENCY RESPONSE

(71) Applicant: CIMCON Lighting, Inc., Billerica, MA (US)

(72) Inventors: Anil Agrawal, Westford, MA (US); Shweta Agrawal, Westford, MA (US)

(73) Assignee: CIMCON Lighting, Inc., Billerica, MA (US)

( * ) Notice: Subject to any disclaimer, the term of this patent is extended or adjusted under 35 U.S.C. 154(b) by 0 days.

(21) Appl. No.: 15/887,652

(22) Filed: Feb. 2, 2018

(51) Int. Cl.
*G08B 5/38* (2006.01)
*H04W 4/90* (2018.01)
*H05B 37/02* (2006.01)
*F21S 8/08* (2006.01)
*G08B 25/01* (2006.01)
*H04W 4/02* (2018.01)

(52) U.S. Cl.
CPC ............... *G08B 5/38* (2013.01); *F21S 8/086* (2013.01); *G08B 25/016* (2013.01); *H04W 4/90* (2018.02); *H05B 37/0272* (2013.01); *H04W 4/023* (2013.01)

(58) Field of Classification Search
CPC ......... G08G 1/205; G08B 5/38; G08B 25/016
USPC ............... 455/521, 404.1, 404.2, 422.1, 403, 455/414.1–414.2, 410, 411, 412, 445, 455/550.1; 340/4.62, 7.5, 8.1
See application file for complete search history.

(56) References Cited

U.S. PATENT DOCUMENTS

| | | | | |
|---|---|---|---|---|
| 8,626,112 | B2* | 1/2014 | Ray | G10L 13/043 455/404.1 |
| 2006/0229100 | A1* | 10/2006 | Born | H04W 48/16 455/557 |
| 2009/0191842 | A1* | 7/2009 | Piett | G06F 21/6245 455/404.2 |
| 2011/0053492 | A1* | 3/2011 | Hochstein | H05B 37/0272 455/7 |
| 2013/0013091 | A1* | 1/2013 | Cavalcanti | H05B 37/0272 700/90 |
| 2014/0354188 | A1* | 12/2014 | Takahashi | H05B 37/0245 315/312 |

(Continued)

FOREIGN PATENT DOCUMENTS

WO WO 2013/109765 7/2013

*Primary Examiner* — Keith Ferguson
(74) *Attorney, Agent, or Firm* — Fish & Richardson P.C.

(57) ABSTRACT

A method of controlling streetlights by a centralized streetlight management system is described. The method includes receiving, from a user device, information corresponding to a request for assistance and determining, based on the information, a location of the user device. The method also includes sending, from the centralized streetlight management system, information corresponding to the location of the user device to one or more computing devices associated with an assistance-providing authority, and receiving, from the one or more computing devices associated with the assistance-providing authority, information indicating dispatch of assistance to the location of the user device. The method also includes, responsive to receiving the information indicating dispatch of assistance to the location of the user device, transmitting, from the centralized streetlight management system, one or more control signals to at least one streetlight at the location of the user device.

55 Claims, 9 Drawing Sheets

(56) References Cited

U.S. PATENT DOCUMENTS

| | | | |
|---|---|---|---|
| 2015/0319825 A1* | 11/2015 | Destine | H05B 37/0227 |
| | | | 315/153 |
| 2016/0057595 A1* | 2/2016 | Ahmed | H04W 4/90 |
| | | | 455/404.1 |
| 2017/0245130 A1* | 8/2017 | Mehta | H04W 4/90 |
| 2017/0339542 A1* | 11/2017 | Bocanegra | H04W 4/90 |
| 2018/0020091 A1* | 1/2018 | Self | H04W 4/90 |

* cited by examiner

STREETLIGHT CONTROL FOR EMERGENCY RESPONSE

TECHNICAL FIELD

This disclosure generally relates to a streetlight control system for emergency response.

BACKGROUND

Many cities and towns have thousands of streetlights to keep streets and walkways lit at night. A given streetlight may be turned on or off using a photocell or a streetlight controller deployed on the streetlight. Streetlight controllers can control operation of the streetlight based on an input to the streetlight controller.

SUMMARY

In one aspect, a method of controlling streetlights by a centralized streetlight management system is described. The method includes receiving, from a user device, information corresponding to a request for assistance and determining, based on the information, a location of the user device. The method also includes sending, from the centralized streetlight management system, information corresponding to the location of the user device to one or more computing devices associated with an assistance-providing authority. The method also includes receiving, from the one or more computing devices associated with the assistance-providing authority, information indicating dispatch of assistance to the location of the user device. The method also includes, responsive to receiving the information indicating dispatch of assistance to the location of the user device, transmitting, from the centralized streetlight management system, one or more control signals to at least one streetlight at the location of the user device, wherein the one or more control signals include instructions to change a lighting mode of the streetlight from a first lighting mode to a second lighting mode.

In some implementations, the request for assistance is based on user-input received through a user-interface displayed on the user device.

In some implementations, the request for assistance is based on a user-input received through at least one motion sensor of the user device. In some cases, the at least one motion sensor includes an accelerometer. In some cases, the at least one motion sensor includes a gyroscope.

In some implementations, the second lighting mode is a blinking mode.

In some implementations, the second lighting mode is a full power mode.

In some implementations, the at least one streetlight at the location of the user device is located within a predetermined radius of the location of the user device.

In some implementations, the method further includes cataloging the request for assistance and the sent control signal in a database. In some cases, the method further includes determining a responsiveness score of the assistance-providing authority based on the cataloged request.

In some implementations, the method further includes, upon receiving information indicating dispatch of assistance to the location of the user device, sending, to the user device from the centralized streetlight management system, information corresponding to a confirmation that assistance is being provided.

In some implementations, the method further includes transmitting one or more reset signals to the at least one streetlight, wherein the one or more reset signals include instructions to change a lighting mode of the streetlight from the second lighting mode to the first lighting mode. In some cases, the one or more reset control signals is sent responsive to receiving, at the centralized streetlight management system, information that assistance has arrived at the location of the user device.

In some implementations, the information corresponding to the location of the user device includes information configured to be presented on a map at the one or more computing devices associated with the assistance-providing authority.

In some implementations, the method further includes receiving, from a user device, information corresponding to an identification of a user and determining, from the information corresponding to the identification, that the request for assistance is originating from an authorized user.

In another aspect, a method of requesting assistance via an application installed on a user device is described. The method includes presenting, on a display associated with the user device, a user interface for requesting assistance. The method also includes receiving, via the user interface, user-input indicative of a request for assistance. The method also includes transmitting from the user device, information corresponding to the request for assistance, the information being configured to be addressed to a centralized streetlight management system. The method also includes receiving from the centralized streetlight management system, confirmation indicating dispatch of assistance in response to the request and, responsive to receiving the confirmation, displaying, on the user device, a graphical representation of the confirmation.

In some implementations, the graphical representation of the confirmation includes a text string.

In some implementations, the graphical representation of the confirmation includes a map depicting a real-time location of the assistance being provided.

In some implementations, the information corresponding to a request for assistance includes location information for the user device.

In some implementations, the user-input indicative of a request for assistance includes information related to a type of emergency. In some cases, the user interface includes a selection of icons, each icon corresponding to a different type of emergency. In some cases, the type of emergency is a medical emergency.

In another aspect, a centralized streetlight management system is described. The centralized streetlight management system includes a receiver configured to receive, from a user device, information corresponding to a request for assistance and configured to receive, from one or more computing devices associated with an assistance-providing authority, information indicating dispatch of assistance. The centralized streetlight management system also includes a controller configured to determine, based on the received information, a location of the user device. The centralized streetlight management system also includes a transmitter configured to transmit, based on the received information corresponding to the request for assistance, information corresponding to the location of the user device to the one or more computing devices associated with the assistance-providing authority and one or more control signals to at least one streetlight at the location of the user device. The request for assistance is based on user-input received through a user-interface displayed on the user device and the one or more control signals include instructions to change a lighting mode of the streetlight from a first lighting mode to a second lighting mode.

In some implementations, the transmitter is further configured to transmit, to the user device, information corresponding to a confirmation that assistance is being provided.

In some implementations, the second lighting mode is a blinking mode. In some cases, in the blinking mode, a frequency of blinking is indicative of an estimated arrival time of assistance at the location of the user device. In some cases, in the blinking mode, a frequency of blinking is based on a type of emergency.

In some implementations, the second lighting mode is a full power mode.

In some implementations, the control signal is sent to any streetlight within a predetermined radius of the location of the user device.

In some implementations, the technology described herein may provide one or more of the following advantages.

In another aspect, this document describes one or more non-transitory machine-readable storage devices storing instructions executable by one or more processing devices to perform various operations. The operations include presenting, on a display associated with a user device, a user interface for requesting assistance, receiving user-input indicative of a request for assistance and transmitting information corresponding to the request for assistance. The transmitted information is configured to be addressed to a centralized streetlight management system. The operations also include receiving confirmation indicating dispatch of assistance in response to the request and responsive to receiving the confirmation, displaying, on the user device, a graphical representation of the confirmation.

A centralized streetlight management system may be leveraged to allow access to emergency services through an application installed on mobile devices. By providing a simple interface, the application may allow a user to request emergency assistance, potentially discreetly, without dialing a phone number or speaking with anyone over the phone. Upon being triggered, the application may also be configured to automatically provide identification information and/or location information to the corresponding authorities to facilitate quicker deployment of assistance. In some implementations, a location of the mobile device may be passed directly to a corresponding authority. For example, a GPS location of the mobile device may be passed directly to campus security if a request originates on a college campus from a verified user. In some implementations, controllers deployed on streetlights may communicate with the application executing on a mobile device, allowing the location of the mobile device, and hence the user, may be determined accurately.

In some cases, once a user requests emergency services, the streetlight management system may also be employed to alert the public to the emergency situation. For example, streetlight controllers can be used to cause corresponding streetlights to blink in the proximity of the location of the emergency situation, such that the location is easily identifiable. The blinking streetlights in turn may alert the general public that someone needs help, thereby allowing a member of the public to potentially help the person requesting assistance even before the arrival of authorities. In some cases, by drawing attention to the area of the emergency situation, the blinking of the streetlights, potentially accompanied by one or more additional audio-visual alarms, may also serve as a deterrent to the emergency situation being escalated. For example, by drawing immediate attention to the area of the emergency situation, the technology described herein may be used to prevent a potential crime, or mitigate the harm resulting from a crime, by causing the perpetrator to flee the area.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

Like reference symbols in the various drawings indicate like elements.

DETAILED DESCRIPTION

This document describes technology for implementing an emergency alert system using a network of streetlight controllers, a centralized streetlight management system, and mobile devices. Emergency response systems, for example Blue Light Systems, are important because they allow a person to quickly request assistance at their location. Many Blue Light Systems include call boxes disposed in public areas and may be managed by, for example, universities, hospitals, etc. These call boxes have blue lights on top to signal their presence to the public. However, these Blue Light Systems are expensive to maintain and may be ineffective in certain emergency situations. For example, a Blue Light System is ineffective if a user cannot get to a call box and/or reach the button on the call box to begin a call due to the nature of their emergency. For example, if a person has a broken leg or if they are being restrained by another person, they may not be able to place a request for assistance.

The emergency alert system described herein allows users to request assistance through an application on their mobile device, which does not have the same physical constraints of existing Blue Light Systems. Additionally, the emergency alert system described herein leverages streetlight controller systems to change a mode of the streetlights in the area of the request for assistance to bring public awareness that a person in the area needs assistance, provide information to a requestor, and/or scare away a person doing the requestor harm. The streetlights may additionally be controlled by a responder to provide optimum lighting in the area during the emergency response.

Figure 1:
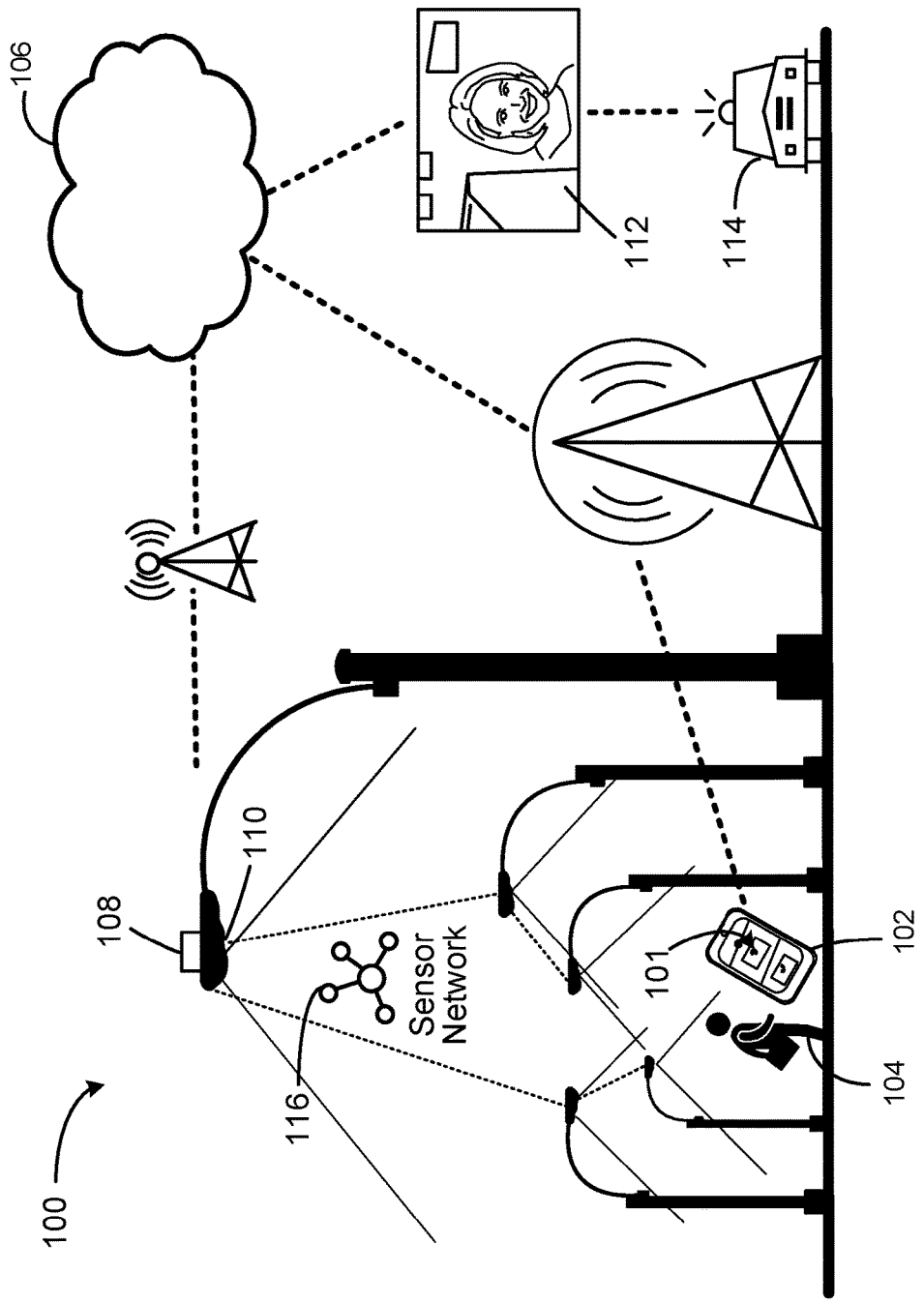
FIG. 1 is a schematic diagram illustrating an example of an emergency alert system.

FIG. 1 is a schematic diagram illustrating an example of an emergency alert system 100. The emergency alert system 100 includes a mobile device 102. The mobile device 102 includes an emergency alert application with a user-interface such that a user 104 of the mobile device 102 may request assistance through the emergency alert application 101. In some implementations, the user 104 may press a help button in the emergency alert application 101. In other implementations, a user may request assistance via a voice command. In such implementations, the voice command may cause the mobile device 102 to open and send a request for assistance through the emergency alert application 101. In other implementations, a gesture or motion (e.g. repeatedly shaking the mobile device 102) sensed by a motion sensor (e.g., an accelerometer, a gyroscope) of the mobile device 102 may cause the mobile device 102 to open and send a request for assistance through the emergency alert application 101. In other implementations, removing and inserting headphones into a headphone jack of the mobile device 102 three times within a predetermined time period may cause the mobile device 102 to open and send a request for assistance through the emergency alert application 101. In other implementations, pressing and holding a volume button for a predetermined time period may cause the mobile device 102 to open and send a request for assistance through the emergency alert application 101. In other implementations, drawing a particular pattern on an unlock screen may cause the mobile device 102 to open and send a request for assistance through the emergency alert application 101. After a request for assistance has been sent by the mobile device 102, the user may cancel the request through the emergency alert application 101 if the request was sent by mistake or if the user no longer requires assistance.

Upon receiving a request from the user 104 through the application 101, the mobile device 102 can be configured to transmit relevant data, via a wireless network (e.g., a cellular network, WiFi, etc.) to a server associated with a centralized streetlight management system 106. In some implementations, the relevant data transmitted by the mobile device 102 includes, for example, one or more of: location information for the mobile device 102 (e.g., latitude and longitude, an address), device identification information associated with the mobile device, and identification information associated with the application from which the request originates. The relevant data may also include information relating to a type of emergency being experienced at the location of the mobile device 102 (e.g., a medical emergency, a crime, etc.). In some implementations, the data may be appropriately formatted for the receiving server to extract various information from the received data. For example, the transmitted data may include four separate fields that represent: (i) indication that the data originates from an application associated with the emergency alert system 100, (ii) indication that the data originates from a user-facing version of the application, (iii) geographical position information (e.g., coordinates) of the mobile device from which the data originates, and (iv) device identification information of the corresponding mobile device, respectively.

Responsive to receiving the data, the centralized streetlight management system 106 can be configured to communicate information to a network of streetlight controllers deployed in the area from which the request for assistance originates. For example, based on the geographical location information in the received data, the server (or another computing device) of the centralized streetlight management system 106 can be configured to send a control signal to a streetlight controller 108 deployed on a streetlight 110 in the area from which the request for assistance originates. In some implementations, the streetlight controller may be, for example, a wireless-enabled streetlight controller such as the iSLC-3000-7P, iSLC-3100-480-7P, or iSLC-3300 manufactured by CIMCON Lighting Inc., of Billerica, Mass.

In some implementations, based on received the control signal, the streetlight controller 108 can be configured to affect the operation of the corresponding streetlight 110 (and/or one or more other streetlights the controllers for which are connected over a mesh network 116 to the controller 108). In some implementations, the streetlight controller 108, in response to the received control signal, may change a mode of an associated streetlight 110 from a first mode to a second mode. For example, if the first mode is a mode in which the streetlight 110 operates based on ambient light conditions, the control signal may cause the first mode to be changed to a second mode in which the streetlight is powered at full brightness regardless of ambient conditions. In another example, the first mode is a mode in which the streetlight 110 operates based on ambient light conditions and the control signal may cause the first mode to be changed to a second mode in which the streetlight begins to monitor an area around the streetlight with an associated camera or microphone. A speaker on the streetlight 110 may additionally or alternatively be activated in a second mode to provide an audio output in the area of the streetlight.

Other combinations of first and second mode are also possible. In some implementations, the first mode may be a mode of operation based on a sensor input (e.g., a weather sensor, a light sensor) or a mode of operation based on a time-based program that controls the power-on/power-off schedule of the streetlight. The second mode may be a blinking mode wherein the streetlight blinks at a predetermined frequency for a predetermined period of time or until the blinking mode is turned off based on user-input. In some implementations, the blinking may be on/off blinking and in other implementations, the blinking may be high power/low power blinking, wherein the streetlight would blink from a brighter light to a dimmer light at a predetermined frequency. The blinking frequency or type (on/off or bright/dim) may be determined by the type of emergency reported on the mobile device 102. In some implementations, the second mode of operation of the streetlights may include a concomitant audio-visual alarm configured to heighten public awareness that someone in the vicinity of the blinking streetlights requires assistance. In some cases, by alerting the general public in the area to the occurrence of a possible emergency situation, the technology described herein may improve emergency response systems by crowd-sourcing the assistance process, and possibly allowing a user to receive assistance faster, for example, from a member (or multiple members) of the public, and before the appropriate authority arrives.

In some implementations, a frequency of the blinking of the streetlights in the second mode may indicate a status of the request for assistance. For example, the streetlights may blink at higher and higher frequencies as the assistance approaches the user. In some implementations, the frequency of the blinking of the streetlights may be based on a location of each streetlight relative to the location of the mobile device that made the request. For example, all of the streetlights within a predetermined radius from the mobile device may be programmed to blink with the streetlights closest to the mobile device blinking at a higher frequency than the streetlights that are farther away from the mobile device. This blinking pattern may help responders to locate the user within the area of blinking streetlights more quickly upon arrival.

The streetlight controller 108 may be linked with other streetlight controllers in a network 116. In some implementations, the network 116 is a mesh network. In some implementations, the centralized streetlight management system 106 may send a control signal to a controller 108 that is closest to the location of the mobile device 102, and the controller 108 may communicate with other streetlight controllers within a predetermined radius from the location of the mobile device to affect the operations of the streetlights associated with such other streetlight controllers. The predetermined radius may be, for example, approximately 50 meters, approximately 100 meters, approximately 200 meters, approximately 300 meters, approximately 400 meters, etc. from the location of the streetlight 110 deemed closest to the last known-location of the mobile device 102.

The operations of the multiple streetlights in the vicinity of the emergency situation may be affected in various ways. In some implementations, the streetlights can be switched on and off (or switched among two or more power levels), in a manner that indicates a direction towards the location of the emergency. For example, the operations of the streetlights may be coordinated in a way such that a bolus of light appears to move towards the location of the emergency from streetlights located away from the location of the emergency. In some implementations, streetlights located closer to the location of the emergency may be turned on at a higher power as compared to the streetlights located further away from the emergency to indicate a direction towards the location of the emergency. In some implementations, the color of light being radiated by the streetlights (e.g., for streetlights having light emitting diode (LED) lamps) may be adjusted to indicate a direction to the location of the emergency. In some implementations, by allowing an emergency management system to leverage the power of a streetlight management system, the technology described herein may improve the efficacy, response time, and/or reliability of emergency responses.

In some implementations, the centralized streetlight management system 106 may send a confirmation message back to the mobile device 102 upon receiving the request for assistance. The confirmation message can include, for example, text-only information, graphical or other visual information, audible information, or a combination of the foregoing information. In some implementations, the confirmation message may be configured in accordance with a type of emergency reported. For example, responsive to determining that the type of emergency reported is a medical emergency, the centralized streetlight management system 106 may transmit an audio-visual confirmation message. However, upon determining that the type of emergency reported involves a potential crime (e.g. an assault), the confirmation message may be text-only or haptic so as not to alert the perpetrator to the exact location of the user. In some implementations, a confirmation message may include a map (or a hyperlink to a map) including a real-time location of the assistance (e.g. a location of one or more responders).

The centralized streetlight management system 106 also transmits a request for assistance to a corresponding authority 112 for the authority to dispatch assistance as appropriate for the request. The authority 112 may include, for example, one or more of the police, paramedics, an ambulance, the fire department, campus security, etc. The authority to which the request is transmitted can be selected, for example, based on information included in the data received at the centralized streetlight management system 106 from the mobile device 102. For example, if the data from the mobile device 102 includes information relating to a type of emergency, a server or other computing device of the centralized streetlight management system 106 can be configured to select an authority to contact based on extracting the emergency type information from the data received from the mobile device 102. In some instances, a user may select a default authority to be contacted by the centralized streetlight management system 106 in the event of an emergency (e.g. a college campus employing the system may set the default to the campus police). In some implementations, a request for assistance may be directly passed between the mobile device 102 and a corresponding authority 112. The request for assistance may include GPS, or other location, data from the mobile device 102 sending the request. The request for assistance may also be passed from the mobile device 102 to the centralized streetlight management system 106 which will send control signals to the streetlights depending based on the information in the request for assistance.

Figure 2:
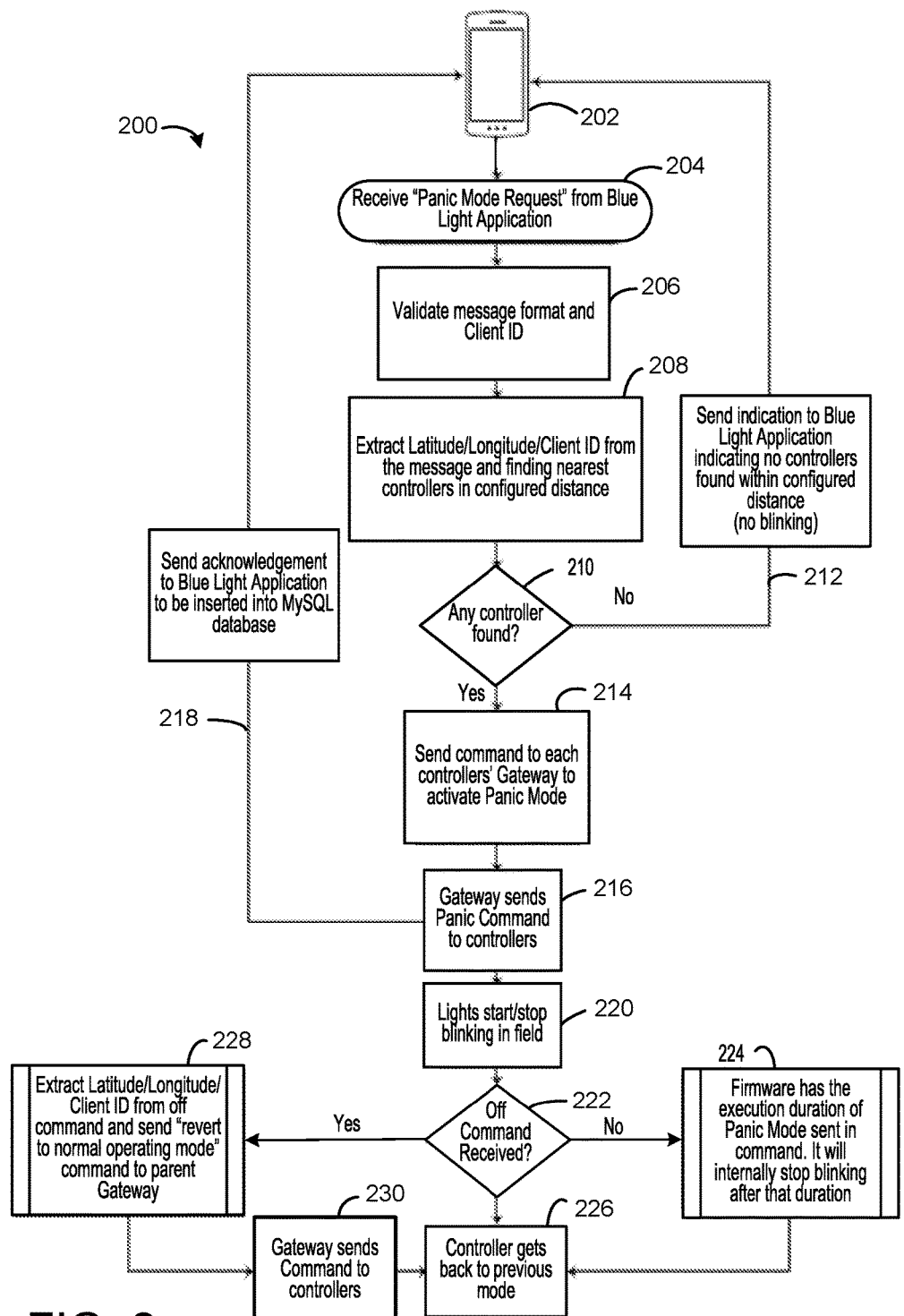
FIG. 2 is a flowchart showing an example of a process of a user requesting assistance and subsequently receiving a response from the emergency alert system.

FIG. 2 is a flowchart showing an example of a process 200 of a user requesting assistance and subsequently receiving a response from the emergency alert system. In one example sequence of operations of the process 200, a mobile device 202 first sends a signal via an emergency alert application (also referred to herein as a "Blue Light Application") installed on the mobile device 202. The signal is sent to and received at a centralized streetlight management system (204) which then validates information included in the signal from the mobile device (206). Information may include, for example, a user's name, identification number, etc. Validation of the information may include, for example, confirming that the signal is originating from a registered user of the emergency alert system by checking identification information received from the mobile device against a database. For example, in some implementations, the emergency alert system is available to all students of a college campus and each student may install the emergency alert application and register with their student identification number. During validation, the system may check a received student identification number against a database to ensure that the request is emanating from a verified user of the system. In some implementations, the centralized streetlight management system extracts location information from the signal sent by the mobile device 202 and executes a process to locate one or more streetlight controllers proximate to the location of the mobile device. The centralized streetlight management system checks to determine whether one or more streetlight controllers are located within a predetermined distance of the location of the mobile device (208). Responsive to determining that there are no streetlight controllers within the predetermined distance, the centralized streetlight management system sends a signal to the mobile device 202 indicating that there are no controllers within range (212). The signal sent to the mobile device can be configured to present, via a user-interface on the mobile device 202, information indicating that the user is unlikely to see any change in the mode of operations of the streetlights in the vicinity. In some implementations, the centralized streetlight management system may instead increase the predetermined distance until at least one streetlight is located. Responsive to determining that one or more streetlight controllers are within the predetermined distance of the location of the mobile device 202, the centralized streetlight management system can be configured to transmit a control signal to one or more gateways associated with the one or more controllers to activate a "Panic Mode" (e.g., a change in the mode of operation of the streetlight, as described above) in response to the emergency reported by the user. In some implementations, each gateway may in turn send control signals to one or more respective controllers to activate the "Panic Mode" at the controllers. Upon sending this control signal to the controllers, the centralized streetlight management system sends an acknowledgement to the mobile device that the request has been received, and the request and response may be saved in a database (218). The controllers, upon activation of the "panic mode," may cause the streetlights blink (220).

In the "panic mode," the controllers can be configured to intermittently check whether a command to deactivate the "panic mode" has been received (222). Upon determining that no such command has been received, the controller may continue to operate under the "panic mode" for a predetermined duration (e.g., as programmed into the firmware), and shuts off after the predetermined duration. For example, the controller can be configured to deactivate the "panic mode" after the predetermined period, and cause the streetlight to switch back to the original mode of the streetlight operational before the emergency was reported at the mobile device 202. Upon determining that a command to deactivate the "panic mode" has been received, the centralized streetlight management system locates the appropriate gateways and sends deactivation signals for the controllers to cause the corresponding streetlights to revert back to the original mode of operation. The gateways in turn send the deactivation signals to the controllers (230), which causes the corresponding streetlights to switch from the "panic mode" to the original mode of operation.

Figure 3A:
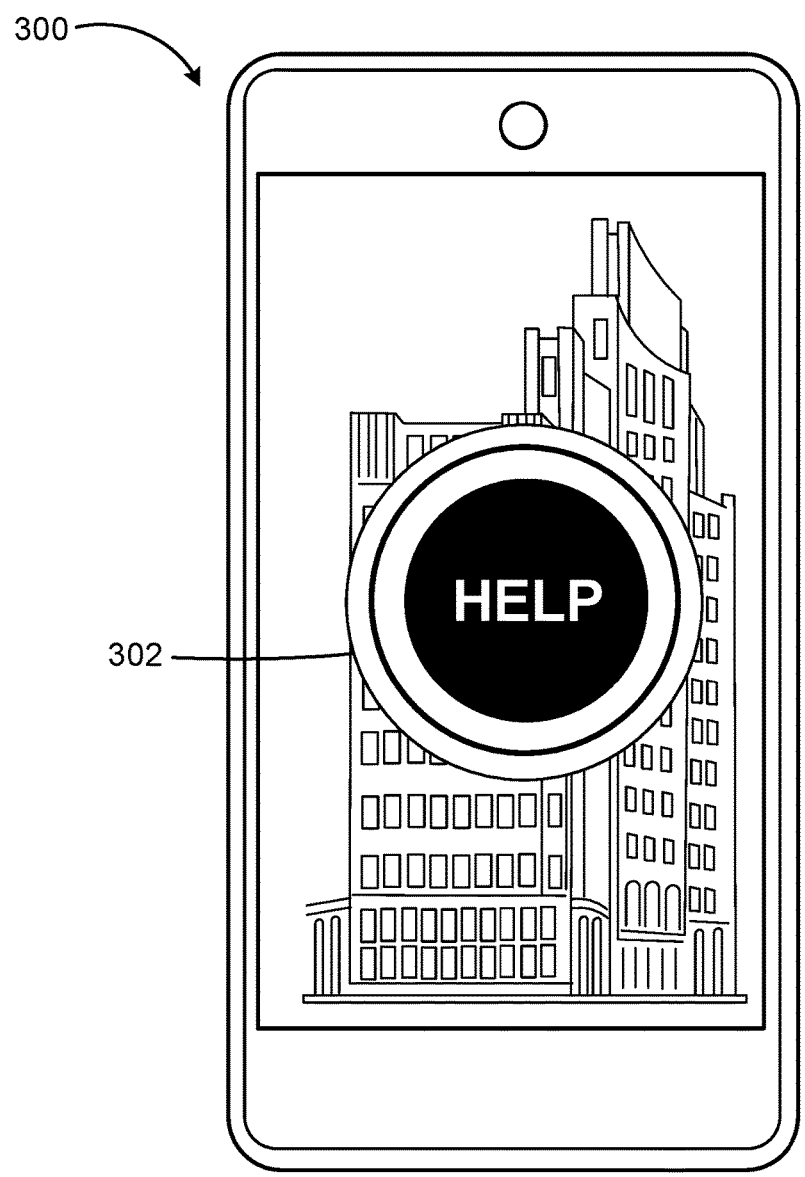
FIG. 3A is an example of a user-interface in a user-facing application usable with the emergency alert system.

FIG. 3A is an example of a user-interface 300 in a user-facing application of the emergency alert system described above. The user launches and/or logs into the emergency alert application on their mobile device 300. Upon signing into the emergency alert application, to request assistance, the user presses a help button 302 on the user interface. When the user presses the help button, a signal indicating a request for assistance is sent to a centralized streetlight management system from the mobile device. In some implementations, the user interface 300 may include an array of icons in addition to or instead of the help button 302. In some implementations, the array of icons may include different icons corresponding to different types of emergencies. For example, the user interface 300 may include an icon for medical emergencies, an icon for fire, an icon for assault, an icon for theft, etc. Based on the icon selected, the mobile device may send a request for assistance to a specific authority, e.g., the fire department if the icon for fire is selected.

In other implementations, a user may request assistance via a voice command. In such implementations, the voice command may cause the mobile device 102 to open and send a request for assistance through the emergency alert application 101. In other implementations, a gesture or motion (e.g. repeatedly shaking the mobile device 102) sensed by a motion sensor (e.g., an accelerometer, a gyroscope) of the mobile device 102 may cause the mobile device 102 to open and send a request for assistance through the emergency alert application 101. In other implementations, removing and inserting headphones into a headphone jack of the mobile device 102 three times within a predetermined time period may cause the mobile device 102 to open and send a request for assistance through the emergency alert application 101. In other implementations, pressing and holding a volume button for a predetermined time period may cause the mobile device 102 to open and send a request for assistance through the emergency alert application 101. In other implementations, drawing a particular pattern on an unlock screen may cause the mobile device 102 to open and send a request for assistance through the emergency alert application 101.

Figure 3B:
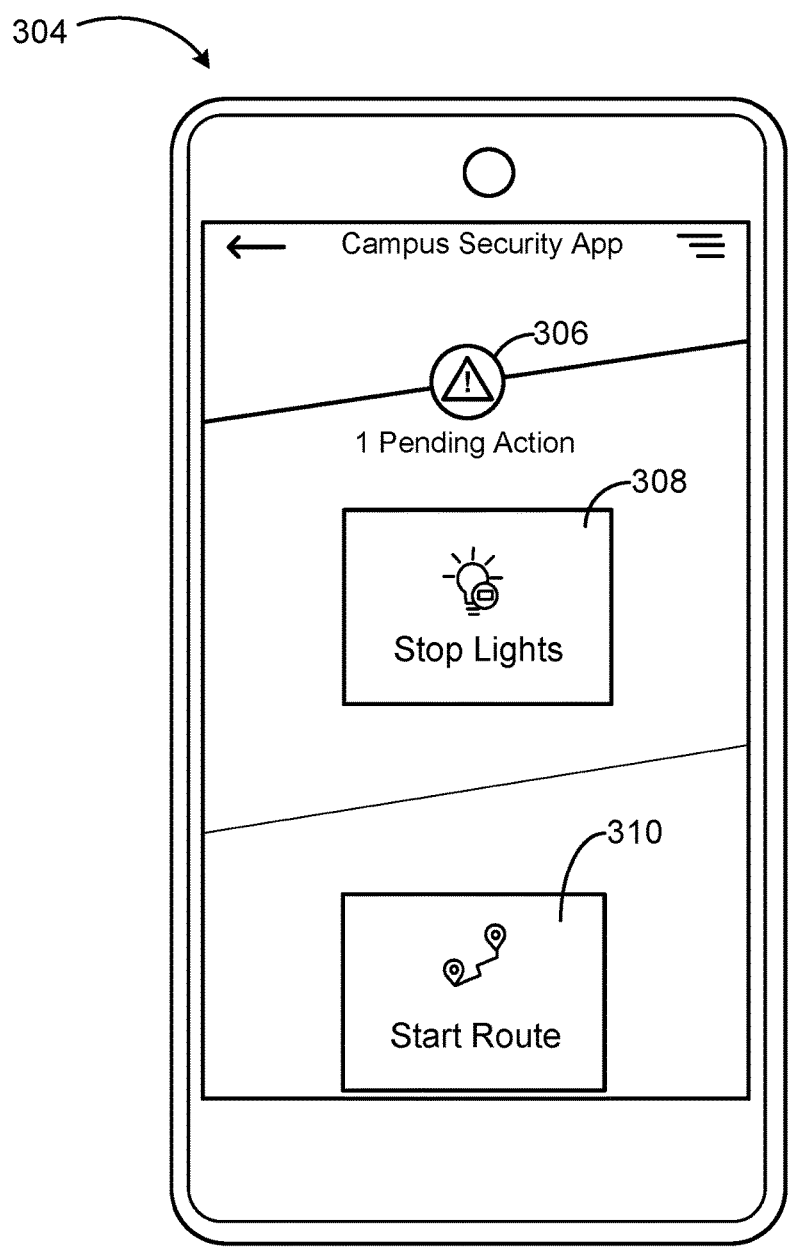
FIG. 3B is an example of a user-interface in a responder-facing application usable with the emergency alert system.
Figure 3C:
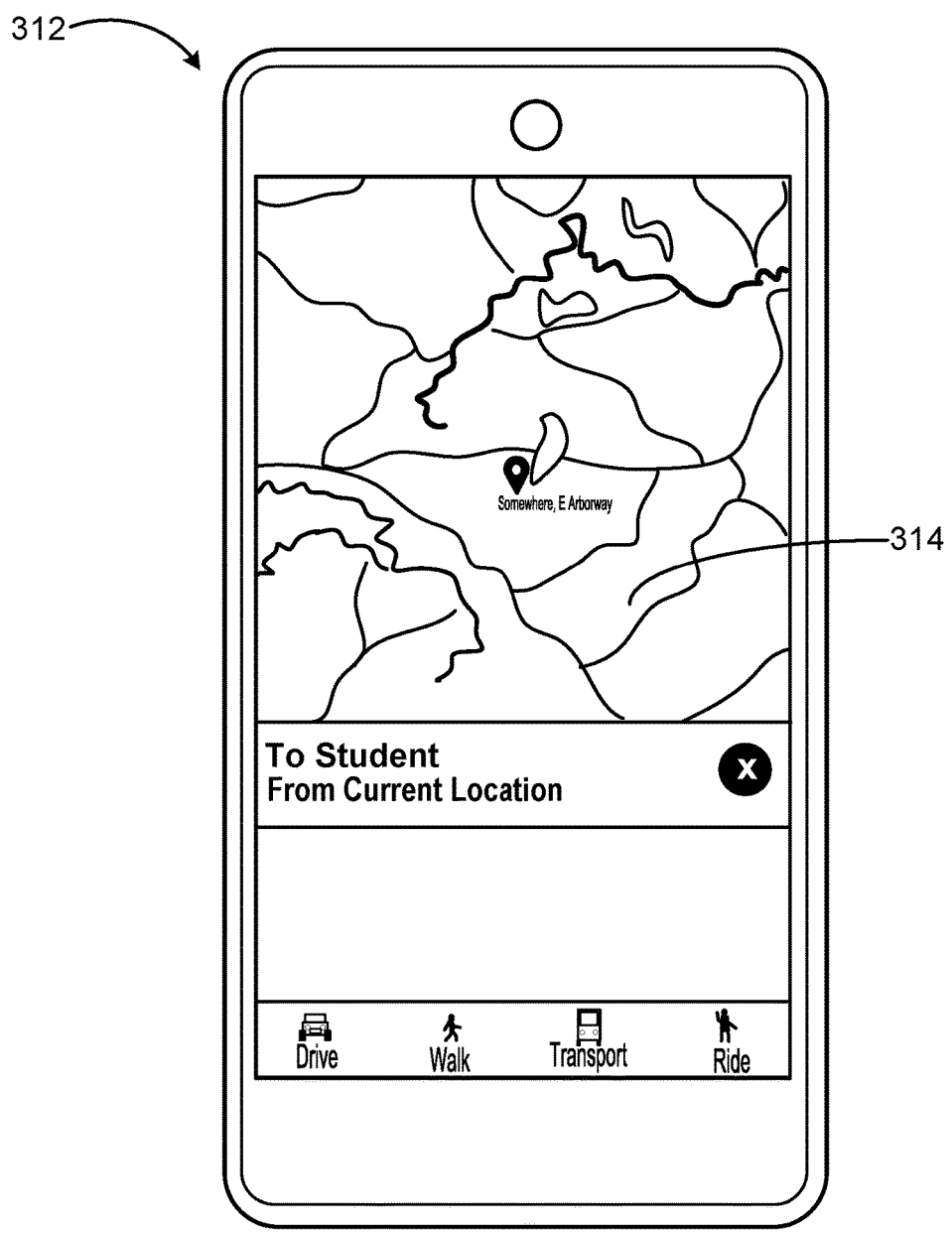
FIG. 3C is an example of a map-based user-interface in a responder-facing application usable with the emergency alert system.

FIG. 3B is an example of a user interface in a responder-facing application of the emergency alert system, and FIG. 3C is an example of a map-based user-interface 304 in a responder-facing application of the emergency alert system. In FIG. 3B, a responder (e.g., a police officer, campus security officer, or a member of the authority responsible for responding to assistance requests, etc.) can use the responder-facing application on his or her mobile device in responding to a request for assistance. The user-interface 304 can include one or more controls and display elements that present various types of information and/or facilitate various actions of the responder in responding to requests for assistance. For example, the user-interface 304 can include a control (e.g., an interactive icon or button) 306 that allows the responder to view the number and nature of pending actions that needs attention. The user-interface 304 may also include an interactive control (e.g., the "Stop Lights" button 308) an activation of which causes the streetlights at the location of the emergency to stop blinking in the "panic mode," and return to their original mode of operation. A responder may use the button 308, for example, to deactivate the "panic mode" upon arrival at the scene of the emergency. Upon pressing the button 308, the mobile device sends a signal to the centralized streetlight management system to revert the streetlight back to its first operating mode. Upon receiving this signal, a reset signal is transmitted by the centralized streetlight management system to the streetlight controller to change a lighting mode from the second mode back to the first mode.

In some implementations, the user interface 304 may also include an interactive control, an activation of which causes the streetlights at the location of the emergency to turn on to full power or to be set to another brightness level. The responder may user the "Stop Lights" button 308 and then turn the streetlights on to full power. This interactive control allows the responder to set the lighting at the location of the emergency to an optimal level based on the nature of the emergency. For example, it may be advantageous to have maximum light during a medical emergency where medical personnel may be addressing an injury or medical condition of a user.

In some implementations, the user-interface 304 may include an interactive control (e.g., the "Start Route" button 310), an activation of which causes the responder-facing application to display directions to the location corresponding to the request for assistance in the pending action. For example, activation of the "Start Route" button 310 can cause the presentation of a map-based user-interface such as the one shown in FIG. 3C. Such a map-based user-interface may be used, for example to guide the responder to the user requesting assistance based on the location data from the respective mobile devices. The map-based user-interface may provide turn by turn directions and may show the responder's real-time location on the map in relation to the location of the user and mobile device that sent the request for assistance. In some implementations, the map-based user-interface may be provided from a different third-party application.

Figure 3D:
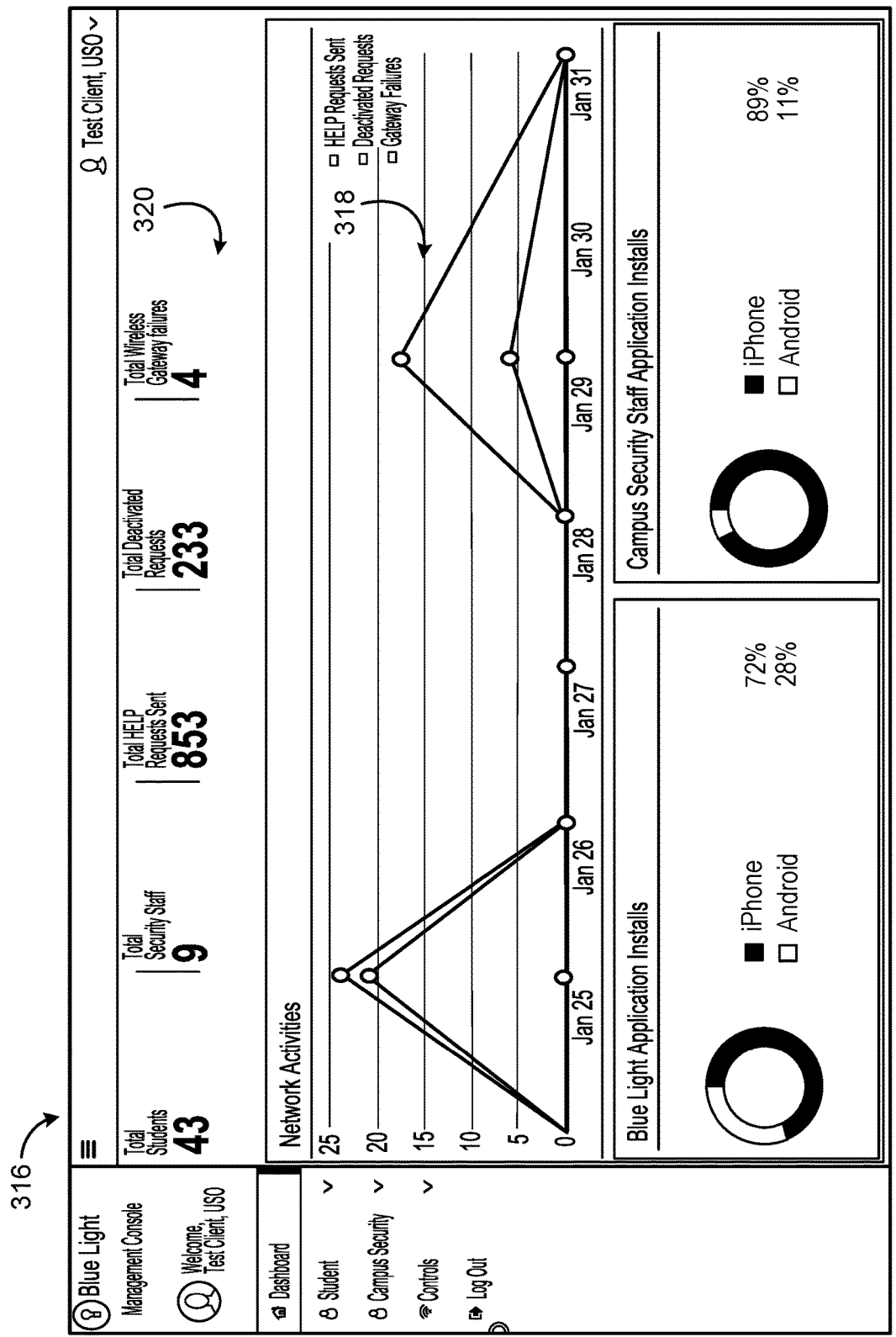
FIG. 3D is an example of a user-interface at a centralized management system associated with the emergency alert system.

FIG. 3D is an example of a user-interface 316 at a centralized management system associated with the emergency alert system. In some implementations, the user interface 316 can be used to present various data corresponding to requests for assistance received by the system. For example, the user interface 316 may display a network activities graph 318 which may track data over a period of time, e.g., daily, monthly, weekly, etc. The network activities graph 318 may be adjusted to show a particular time or date range. In some implementations, the user interface 316 includes data fields 320 which may report daily requests for assistance, time to respond to requests for assistance, etc. In some implementations, the centralized streetlight management system may track and be configured to present on a display, 1) registrations for the emergency alert application, 2) a date, time, and GPS location that a user pressed the help button on their mobile device, 3) registrations for the emergency alert application by responders, 4) time required for a responder to accept a request for assistance, 5) a location and time where a request was stopped by a responder, 6) a difference in the time between the request for assistance and a deactivation of the request by a responder, 7) the number of requests for assistance over a specified date range, 8) locations of requests for assistance, 9) outcomes of requests for assistance, 10) errors recorded at gateways, 11) cancelled requests for assistance. Other displays and calculations may be performed by the centralized streetlight management system with data from the requests for assistance and data from the responders. For example, the centralized streetlight management system may calculate a crime rate in a particular area, e.g., on a college campus. The crime rate data may be saved and tracked over a period of time. Another calculation that may be performed is calculating a responsiveness score of an assistance-providing authority based on data cataloged by the centralized streetlight management system. For example, a responsiveness score may be a score on a 0-10 scale that is calculated based upon responder performance. Responder performance may be assessed through collected data such as 1) time required for the responder to accept the request for assistance, 2) a difference in the time between the request for assistance and a deactivation of the request by a responder (indicating that the responder has arrived at the location of the emergency), 3) outcomes of requests for assistance. Responsiveness scores may be helpful in assessing effectiveness of responders and/or may shed light on barriers that may be preventing optimum emergency response from occurring.

Figure 4:
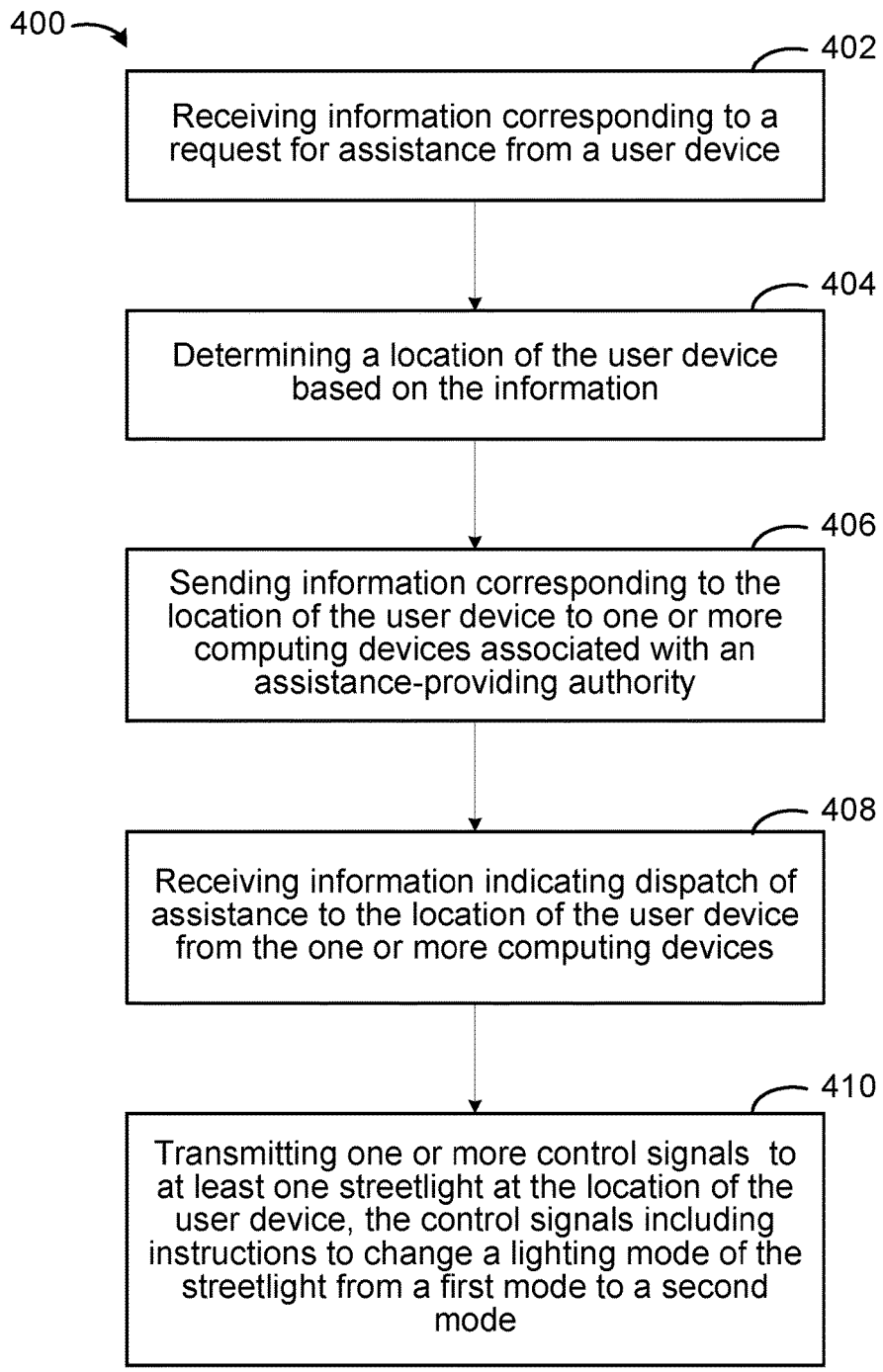
FIG. 4 is a flowchart showing an example method of controlling streetlights by a centralized streetlight management system.

Referring to FIG. 4, the flowchart 400 depicts an example of a process for controlling streetlights by a centralized streetlight management system. In some implementations, at least a portion of the process shown in the flowchart 400 is executed by one or more processing devices of the streetlight management system 106 described above with reference to FIG. 1. Operations of the process 400 include receiving from a user device, information corresponding to a request for assistance (402). The request for assistance may be activated by a voice command, a gesture or motion sensed by a motion sensor on the user device, by pressing a button on a user interface displayed on the user device, etc. Operations of the process 400 also include determining, based on the information, a location of the user device (404), and sending, from the centralized streetlight management system, information corresponding to the location of the user device to one or more computing devices associated with an assistance-providing authority (406). Operations of the process also include receiving, from the one or more computing devices associated with the assistance-providing authority, information indicating dispatch of assistance to the location of the user device (408), and responsive to receiving the information indicating dispatch of assistance to the location of the user device, transmitting, from the centralized streetlight management system, one or more control signals to at least one streetlight at the location of the user device (410). The one or more control signals can include instructions to change a lighting mode of the streetlight from a first lighting mode to a second lighting mode.

Figure 5:
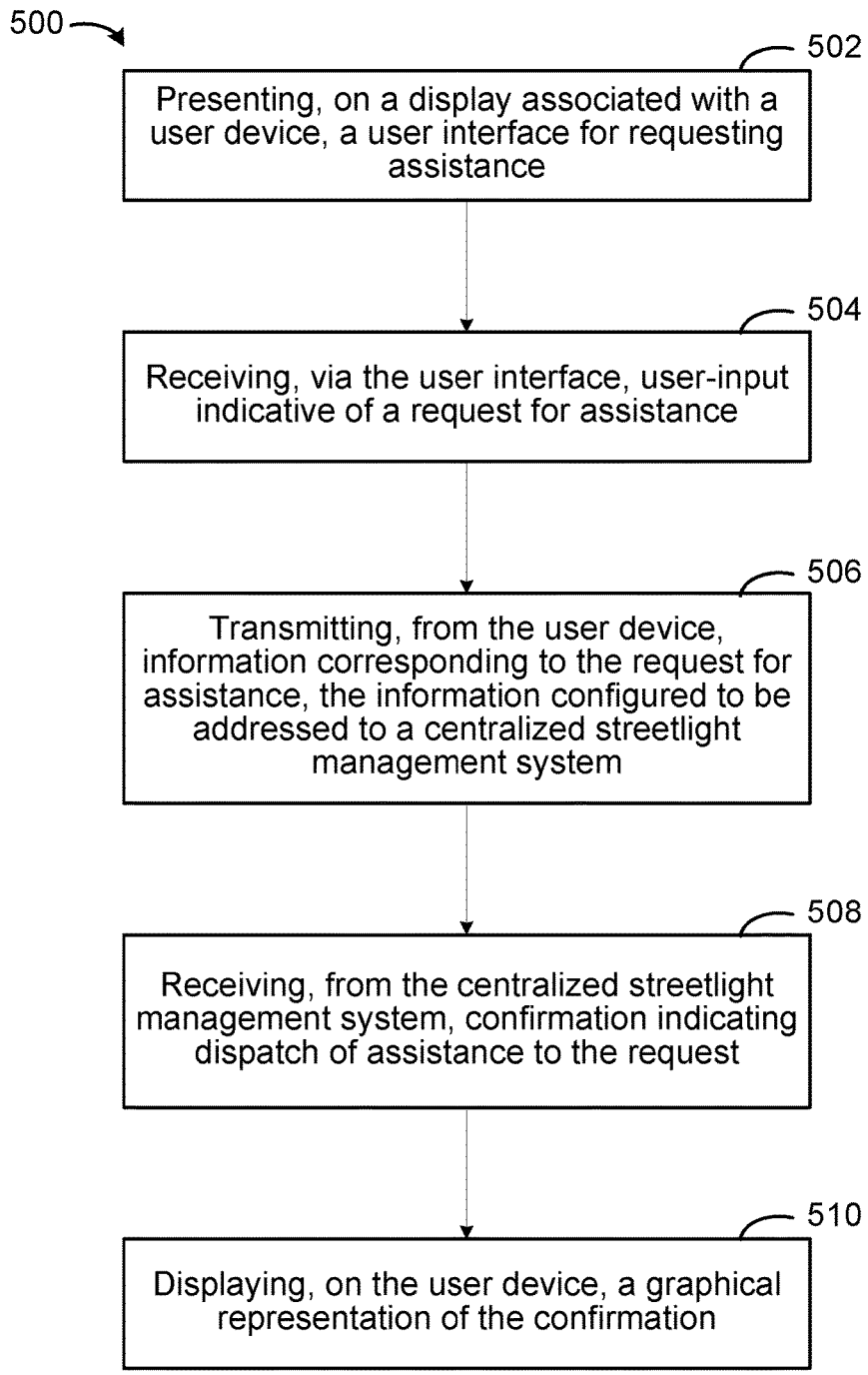
FIG. 5 is a flowchart showing an example method of requesting assistance via an application installed on a user device.

Referring to FIG. 5, a flowchart shows an example process 500 of requesting assistance via an application installed on a user device. In some implementations, at least a portion of the process 500 is executed on the user device 102 described above with reference to FIG. 1. Operations of the process 500 include presenting on a display associated with the user device, a user interface for requesting assistance (502). Operations of the process 500 also include receiving, via the user interface, user-input indicative of a request for assistance (504), and transmitting from the user device, information corresponding to the request for assistance (506). The information can be configured to be addressed to a centralized streetlight management system. Operations of the process 500 also include receiving from the centralized streetlight management system, confirmation indicating dispatch of assistance in response to the request (508), and responsive to receiving the confirmation, displaying, on the user device, a graphical representation of the confirmation (510).

Figure 6:
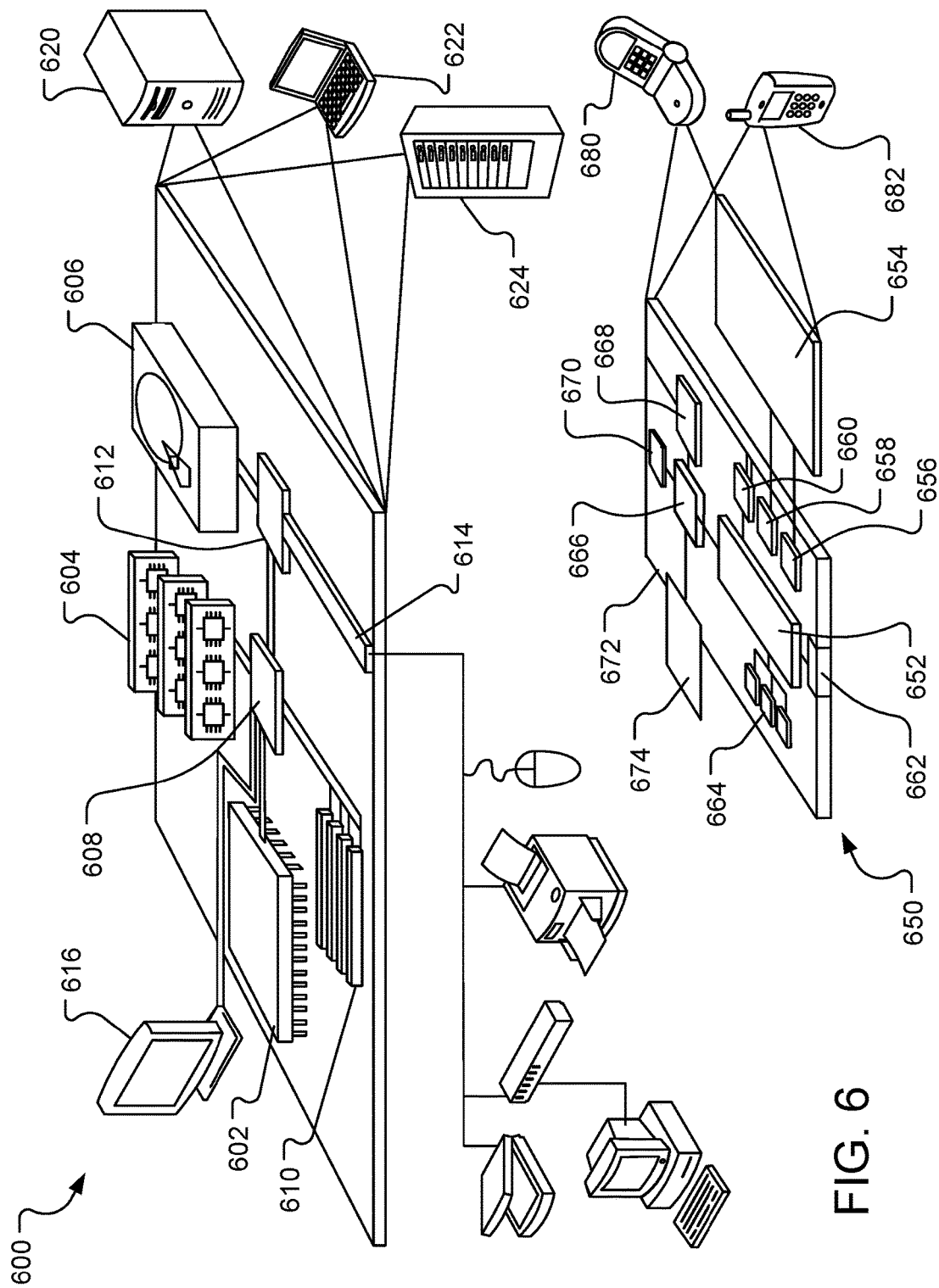
FIG. 6 is a block diagram showing an example of a computing device.

FIG. 6 shows an example of a computing device 600 and a mobile device 650, which may be used with the techniques described here. For example, referring to FIG. 1, the gateway device 108, streetlight controller 104, or devices 116, 120 or 122 could be examples of the computing device 600 or the mobile device 650. Computing device 600 is intended to represent various forms of digital computers, such as laptops, desktops, workstations, personal digital assistants, servers, tablet computers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display, a communication interface 666, and a transceiver 668, among other components. The device 650 may also be provided with a storage device, such as a microdrive or other device, to provide additional storage. Each of the components 650, 652, 664, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display. The display may be, for example, a TFT LCD (Thin-Film-Transistor Liquid Crystal Display) or an OLED (Organic Light Emitting Diode) display, or other appropriate display technology. The display interface 656 may include appropriate circuitry for driving the display to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) or touchscreen by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are also within the scope of the following claims.

What is claimed is:

1. A method of controlling streetlights by a centralized streetlight management system, the method comprising:
   receiving, from a user device, information corresponding to a request for assistance;
   determining, based on the information, a location of the user device;
   sending, from the centralized streetlight management system, information corresponding to the location of the user device to one or more computing devices associated with an assistance-providing authority;
   receiving, from the one or more computing devices associated with the assistance-providing authority, information indicating dispatch of assistance to the location of the user device; and
   responsive to receiving the information indicating dispatch of assistance to the location of the user device, transmitting, from the centralized streetlight management system, one or more control signals to at least one streetlight at the location of the user device, wherein the one or more control signals comprise instructions to change a lighting mode of the streetlight from a first lighting mode to a second lighting mode,
   wherein the at least one streetlight at the location of the user device is located within a predetermined radius of the location of the user device.

2. The method of claim 1, wherein the request for assistance is based on user-input received through a user-interface displayed on the user device.

3. The method of claim 1, wherein the request for assistance is based on a user-input received through at least one motion sensor of the user device.

4. The method of claim 3, wherein the at least one motion sensor comprises an accelerometer.

5. The method of claim 3, wherein the at least one motion sensor comprises a gyroscope.

6. The method of claim 1, wherein the second lighting mode is a blinking mode.

7. The method of claim 1, wherein the second lighting mode is a full power mode.

8. The method of claim 1, wherein the information corresponding to the location of the user device comprises information configured to be presented on a map at the one or more computing devices associated with the assistance-providing authority.

9. The method of claim 1, further comprising receiving, from the user device, information corresponding to an identification of a user and determining, from the information corresponding to the identification, that the request for assistance is originating from an authorized user.

10. A method of controlling streetlights by a centralized streetlight management system, the method comprising:
    receiving, from a user device, information corresponding to a request for assistance;
    determining, based on the information, a location of the user device;
    sending, from the centralized streetlight management system, information corresponding to the location of the user device to one or more computing devices associated with an assistance-providing authority;

receiving, from the one or more computing devices associated with the assistance-providing authority, information indicating dispatch of assistance to the location of the user device;

responsive to receiving the information indicating dispatch of assistance to the location of the user device, transmitting, from the centralized streetlight management system, one or more control signals to at least one streetlight at the location of the user device, wherein the one or more control signals comprise instructions to change a lighting mode of the streetlight from a first lighting mode to a second lighting mode; and cataloging the request for assistance and the one or more transmitted control signals in a database.

11. The method of claim 10, further comprising determining a responsiveness score of the assistance-providing authority based on the cataloged request.

12. The method of claim 10, wherein the request for assistance is based on user-input received through a user-interface displayed on the user device.

13. The method of claim 10, wherein the request for assistance is based on a user-input received through at least one motion sensor of the user device.

14. The method of claim 10, wherein the second lighting mode is a blinking mode.

15. The method of claim 10, wherein the second lighting mode is a full power mode.

16. The method of claim 10, wherein the information corresponding to the location of the user device comprises information configured to be presented on a map at the one or more computing devices associated with the assistance-providing authority.

17. The method of claim 10, further comprising receiving, from the user device, information corresponding to an identification of a user and determining, from the information corresponding to the identification, that the request for assistance is originating from an authorized user.

18. A method of controlling streetlights by a centralized streetlight management system, the method comprising:

receiving, from a user device, information corresponding to a request for assistance;

determining, based on the information, a location of the user device;

sending, from the centralized streetlight management system, information corresponding to the location of the user device to one or more computing devices associated with an assistance-providing authority;

receiving, from the one or more computing devices associated with the assistance-providing authority, information indicating dispatch of assistance to the location of the user device;

responsive to receiving the information indicating dispatch of assistance to the location of the user device, transmitting, from the centralized streetlight management system, one or more control signals to at least one streetlight at the location of the user device, wherein the one or more control signals comprise instructions to change a lighting mode of the streetlight from a first lighting mode to a second lighting mode; and upon receiving information indicating dispatch of assistance to the location of the user device, sending, to the user device from the centralized streetlight management system, information corresponding to a confirmation that assistance is being provided.

19. The method of claim 18, wherein the request for assistance is based on user-input received through a user-interface displayed on the user device.

20. The method of claim 18, wherein the request for assistance is based on a user-input received through at least one motion sensor of the user device.

21. The method of claim 18, wherein the second lighting mode is a blinking mode.

22. The method of claim 18, wherein the second lighting mode is a full power mode.

23. The method of claim 18, wherein the information corresponding to the location of the user device comprises information configured to be presented on a map at the one or more computing devices associated with the assistance-providing authority.

24. The method of claim 18, further comprising receiving, from the user device, information corresponding to an identification of a user and determining, from the information corresponding to the identification, that the request for assistance is originating from an authorized user.

25. A method of controlling streetlights by a centralized streetlight management system, the method comprising:

receiving, from a user device, information corresponding to a request for assistance;

determining, based on the information, a location of the user device;

sending, from the centralized streetlight management system, information corresponding to the location of the user device to one or more computing devices associated with an assistance-providing authority;

receiving, from the one or more computing devices associated with the assistance-providing authority, information indicating dispatch of assistance to the location of the user device;

responsive to receiving the information indicating dispatch of assistance to the location of the user device, transmitting, from the centralized streetlight management system, one or more control signals to at least one streetlight at the location of the user device, wherein the one or more control signals comprise instructions to change a lighting mode of the streetlight from a first lighting mode to a second lighting mode; and transmitting one or more reset signals to the at least one streetlight, wherein the one or more reset signals comprise instructions to change the lighting mode of the streetlight from the second lighting mode to the first lighting mode.

26. The method of claim 25, wherein the one or more reset signals is sent responsive to receiving, at the centralized streetlight management system, information that assistance has arrived at the location of the user device.

27. The method of claim 25, wherein the request for assistance is based on user-input received through a user-interface displayed on the user device.

28. The method of claim 25, wherein the request for assistance is based on a user-input received through at least one motion sensor of the user device.

29. The method of claim 25, wherein the second lighting mode is a blinking mode.

30. The method of claim 25, wherein the second lighting mode is a full power mode.

31. The method of claim 25, wherein the information corresponding to the location of the user device comprises information configured to be presented on a map at the one or more computing devices associated with the assistance-providing authority.

32. The method of claim 25, further comprising receiving, from the user device, information corresponding to an identification of a user and determining, from the information corresponding to the identification, that the request for assistance is originating from an authorized user.

33. A method of requesting assistance via an application installed on a user device, the method comprising:
   presenting, on a display associated with the user device, a user interface for requesting assistance;
   receiving, via the user interface, user-input indicative of a request for assistance;
   transmitting from the user device, information corresponding to the request for assistance, the information being configured to be addressed to a centralized streetlight management system;
   receiving from the centralized streetlight management system, confirmation indicating dispatch of assistance in response to the request; and
   responsive to receiving the confirmation, displaying, on the user device, a graphical representation of the confirmation.

34. The method of claim 33, wherein the graphical representation of the confirmation includes a text string.

35. The method of claim 33, wherein the graphical representation of the confirmation includes a map comprising a real-time location of the assistance being provided.

36. The method of claim 33, wherein the information corresponding to the request for assistance comprises location information for the user device.

37. The method of claim 33, wherein the user-input indicative of the request for assistance includes information related to a type of emergency.

38. The method of claim 37, wherein the user interface includes a selection of icons, each icon corresponding to a different type of emergency.

39. The method of claim 37, wherein the type of emergency is a medical emergency.

40. A centralized streetlight management system, comprising:
   a receiver configured to receive, from a user device, information corresponding to a request for assistance and configured to receive, from one or more computing devices associated with an assistance-providing authority, information indicating dispatch of assistance;
   a controller configured to determine, based on the received information, a location of the user device; and
   a transmitter configured to transmit, based on the received information corresponding to the request for assistance, information corresponding to the location of the user device to the one or more computing devices associated with the assistance-providing authority and one or more control signals to at least one streetlight at the location of the user device,
   wherein the request for assistance is based on user-input received through a user-interface displayed on the user device,
   wherein the one or more control signals comprise instructions to change a lighting mode of the streetlight from a first lighting mode to a second lighting mode, and
   wherein the transmitter is further configured to transmit, to the user device, information corresponding to a confirmation that assistance is being provided.

41. The centralized streetlight management system of claim 40, wherein the second lighting mode is a blinking mode.

42. The centralized streetlight management system of claim 40, wherein the second lighting mode is a full power mode.

43. The centralized streetlight management system of claim 40, wherein the information corresponding to the location of the user device comprises information configured to be presented on a map at the one or more computing devices associated with the assistance-providing authority.

44. The centralized streetlight management system of claim 40, wherein the receiver is further configured to receive, from the user device, information corresponding to an identification of a user and determining, and wherein the controller is further configured to determine, from the information corresponding to the identification, that the request for assistance is originating from an authorized user.

45. A centralized streetlight management system, comprising:
   a receiver configured to receive, from a user device, information corresponding to a request for assistance and configured to receive, from one or more computing devices associated with an assistance-providing authority, information indicating dispatch of assistance;
   a controller configured to determine, based on the received information, a location of the user device; and
   a transmitter configured to transmit, based on the received information corresponding to the request for assistance, information corresponding to the location of the user device to the one or more computing devices associated with the assistance-providing authority and one or more control signals to at least one streetlight at the location of the user device,
   wherein the request for assistance is based on user-input received through a user-interface displayed on the user device,
   wherein the one or more control signals comprise instructions to change a lighting mode of the streetlight from a first lighting mode to a second lighting mode,
   wherein the second lighting mode is a blinking mode, and
   wherein in the blinking mode, a frequency of blinking is indicative of an estimated arrival time of assistance at the location of the user device.

46. The centralized streetlight management system of claim 45, wherein the information corresponding to the location of the user device comprises information configured to be presented on a map at the one or more computing devices associated with the assistance-providing authority.

47. The centralized streetlight management system of claim 45, wherein the receiver is further configured to receive, from the user device, information corresponding to an identification of a user and determining, and wherein the controller is further configured to determine, from the information corresponding to the identification, that the request for assistance is originating from an authorized user.

48. A centralized streetlight management system, comprising:
   a receiver configured to receive, from a user device, information corresponding to a request for assistance and configured to receive, from one or more computing devices associated with an assistance-providing authority, information indicating dispatch of assistance;
   a controller configured to determine, based on the received information, a location of the user device; and
   a transmitter configured to transmit, based on the received information corresponding to the request for assistance, information corresponding to the location of the user device to the one or more computing devices associated with the assistance-providing authority and one or more control signals to at least one streetlight at the location of the user device,
   wherein the request for assistance is based on user-input received through a user-interface displayed on the user device, wherein the one or more control signals comprise instructions to change a lighting mode of the streetlight from a first lighting mode to a second lighting mode,
wherein the second lighting mode is a blinking mode, and
wherein in the blinking mode, a frequency of blinking is based on a type of emergency.

49. The centralized streetlight management system of claim 48, wherein the information corresponding to the location of the user device comprises information configured to be presented on a map at the one or more computing devices associated with the assistance-providing authority.

50. The centralized streetlight management system of claim 48, wherein the receiver is further configured to receive, from the user device, information corresponding to an identification of a user and determining, and wherein the controller is further configured to determine, from the information corresponding to the identification, that the request for assistance is originating from an authorized user.

51. A centralized streetlight management system, comprising:
a receiver configured to receive, from a user device, information corresponding to a request for assistance and configured to receive, from one or more computing devices associated with an assistance-providing authority, information indicating dispatch of assistance;
a controller configured to determine, based on the received information, a location of the user device; and
a transmitter configured to transmit, based on the received information corresponding to the request for assistance, information corresponding to the location of the user device to the one or more computing devices associated with the assistance-providing authority and one or more control signals to at least one streetlight at the location of the user device,
wherein the request for assistance is based on user-input received through a user-interface displayed on the user device,
wherein the one or more control signals comprise instructions to change a lighting mode of the streetlight from a first lighting mode to a second lighting mode, and
wherein the one or more control signals are sent to any streetlight within a predetermined radius of the location of the user device.

52. The centralized streetlight management system of claim 51, wherein the second lighting mode is a blinking mode.

53. The centralized streetlight management system of claim 51, wherein the second lighting mode is a full power mode.

54. The centralized streetlight management system of claim 51, wherein the information corresponding to the location of the user device comprises information configured to be presented on a map at the one or more computing devices associated with the assistance-providing authority.

55. The centralized streetlight management system of claim 51, wherein the receiver is further configured to receive, from the user device, information corresponding to an identification of a user and determining, and wherein the controller is further configured to determine, from the information corresponding to the identification, that the request for assistance is originating from an authorized user.

* * * * *